United States Patent
Schneider et al.

(10) Patent No.: US 7,781,610 B2
(45) Date of Patent: Aug. 24, 2010

(54) HETEROGENEOUS ORGANOTIN CATALYSTS

(75) Inventors: Uwe Schneider, Dortmund (DE); Bernard Jousseaume, Talence (FR); Karine Darriet, Creon (FR); Thierry Toupance, Talence (FR)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 12/709,123

(22) Filed: Feb. 19, 2010

(65) Prior Publication Data

US 2010/0174106 A1 Jul. 8, 2010

Related U.S. Application Data

(62) Division of application No. 11/099,868, filed on Apr. 5, 2005, now Pat. No. 7,687,581.

(30) Foreign Application Priority Data

May 19, 2004 (EP) .................. 04011854

(51) Int. Cl.
C07C 67/02 (2006.01)
C07C 67/03 (2006.01)
(52) U.S. Cl. .................. 560/129; 560/92; 560/205; 560/217; 560/234
(58) Field of Classification Search .................. 560/92, 560/129, 205, 217, 234
See application file for complete search history.

(56) References Cited

U.S. PATENT DOCUMENTS 5,436,357 A  7/1995  Jiang et al.
5,561,205 A  10/1996 Jiang et al.

OTHER PUBLICATIONS

Mercier et al., Organometallics 20 (2001) 958-962.*
Mercier et al., Adv. Synth. Catal. 344 (2002) 33-36.
Miller et al., J. Polymer Science: Part C: Polymer Letters 25 (1987) 219-221.
Weinshenker et al., "Polymeric Reagents. IV. Synthesis and Utilization of an Insoluble Polymeric Organotin Dihydride Reagent" appearing in Journal of Organic Chemistry, vol. 40, No. 13 (1975) pp. 1966-1971.
Hershberger et al., "Preparation of a Highly Functionalized Polystyrene-bound Tin Hydride" appearing in Journal of Polymer Science C: Polymer Letters, vol. 25, 219-221 (1987).
Neumann et al., "A Ploymer-Supported Organotin Hydride and its Multipurpose Application in Radical Organic Synthesis" appearing in The Journal of Organic chemistry, vol. 56, No. 21 (1991).
Mercier et al., "Synthesis, Characterization, and Catalytic Properties of Diphenyl- and Dichlorobutyltin Functionalities Grafted to Insoluble Polystrene Beads by a (CH2)n-(n-4,6) Spacer" appearing in Organometallics. 20. pp. 958-962 (2001).

* cited by examiner

Primary Examiner—Roberto Rabago
(74) Attorney, Agent, or Firm—Joseph Suhadolnik

(57) ABSTRACT

Supported heterogeneous organotin catalysts of the formula X1, X2, or X3:

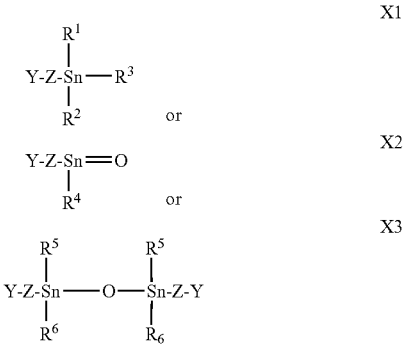

wherein Z is a spacer group;
Y is an insoluble phenyl-group containing copolymer;
$R^1$, $R^2$, $R^3$, $R^5$, and $R^6$ are independently selected from halogen, alkyl, alkylene, phenyl, vinyl, allyl, naphthyl, aralkyl, and Z; and
$R^4$ is alkyl, alkylene, phenyl, vinyl, allyl, naphthyl, or aralkyl.

5 Claims, No Drawings

HETEROGENEOUS ORGANOTIN CATALYSTS

This application is a divisional of and claims priority to U.S. patent application Ser. No. 11/099,868, filed Apr. 5, 2005, now U.S. Pat. No. 7,687,581, the entirety of which is incorporated herein by reference.

The present invention relates to supported heterogeneous organotin catalysts, particularly this invention relates to a process for the preparation of supported organotin catalysts, polymer-supported organotin catalysts for esterification and transesterification reactions and a process for conducting esterification or transesterification reactions.

Homogeneous organotin compounds are known to be effective catalysts for a variety of reactions in the organic chemistry. Organotin compounds show interesting properties as catalysts in organic and silicon chemistry. In these fields, they are mainly used in esterifications, transesterifications, transcarbamoylations for the preparation of polyurethanes, and for the curing of silicones. For this purpose, often mono- and diorganotins are used. Heteroatoms linked to tin can be halides, mainly chlorides, hydroxides or carboxylates. In some cases, mixed halide-hydroxides are the most efficient. Among the advantages of organotin catalysts with respect to others, their very high efficiency, high selectivity and high activity at low concentration are often stressed.

However, homogeneous organotin catalysts are sometimes either difficult to eliminate totally from the products or cannot be removed at all. It is thus one objective of the present invention to provide new and efficient ways to separate chemicals as efficiently as possible from the organotin compounds involved in their preparations. Among all the possibilities to achieve this goal, the use of heterogeneous catalysts is provided by this invention. Whereas homogeneous catalysts are in the same phase as the reactants and reaction products (usually liquid), heterogeneous catalysts are of a different phase than the reaction products. In this way, the organotin catalysts can be removed easily from a liquid reaction mixture by filtration or decantation or sedimentation or similar phase separation steps after reaction.

A variety of different heterogeneous catalysts is known. They have a number of significant advantages over homogeneous catalysts such as ease of separation of the catalyst from reaction products enabling the possibility of re-use and recycling of the heterogeneous catalyst. Whereas some heterogeneous catalysts are sometimes not as selective as homogeneous catalysts, supported heterogeneous catalysts with the active species attached to the support by a chemical bond, are often described as being as selective as their corresponding homogeneous catalysts. However little is known about the reaction mechanism and the special chemical reaction characteristics at the active catalyst centers of heterogeneous catalysts. It is thus questionable whether the chemistry known from homogeneous catalysts will be similar or comparable in reaction media catalyzed by heterogeneous catalysts.

The present invention relates to a heterogeneous organotin catalyst where the active species is chemically fixed by anchoring of the organotin on a solid macromolecular support. More particular, the present invention is concerned with heterogeneous organotin catalysts on a styrene based polymeric support insoluble in most organic based solvents useful in esterifications and transesterification reactions. It is also part of the invention to use special types of heterogeneous organotin catalysts in chemical reactions like esterification and transesterification which are unusual compared to catalyst types known from homogeneous catalysis.

Many of the reactions involving functionalized polymeric support reagents reported in the literature appear to be styrene based. Two synthetic ways are used: polymerization of a styrenic monomer or grafting of the active species onto a defined styrene based polymer.

Jiang, et al. in U.S. Pat. No. 5,436,357 and U.S. Pat. No. 5,561,205 have described polymeric organotin compounds in which the organotin is attached to a styrene based polymer made by polymerization of functionalized styrene based organotin monomers. Although the corresponding organotin catalysts obtained by polymerization lead to polymers with high loading, the inaccessibility of some tins and a difficult control of polymer characteristics during the polymerization reaction remain the main difficulties and drawbacks of this synthetic route. These last points can be avoided by the grafting of the active species directly on a defined polystyrene. First Weinshenker (*J. Org. Chem.*, 1975, 1966) reported such a synthesis in which the tin atoms were directly linked to the phenyl group through a weak bond. Hershberger (*J. Polym. Sci.*, 1987, 219) and Neumann (*J. Org. Chem.*, 1991, Vol. 56, No. 21, 5971-5972) describe the introduction of an ethylenic spacer between the active site and the polymer. However, in all these examples, the tin was in labile positions resulting in a labile chemical bond with high leaching of the organotin species. Mercier (*Organometallics*, 2001, 958) reports tin-functionalized polystyrenes but limits his synthesis to transesterification tests of grafted diphenyl- and dichloro tin species.

The present invention relates to heterogeneous styrene based organotin catalysts with a suitable spacer between the polymer (polystyrene) and the tin functionality efficient in preventing cleavage of the tin bond and resulting in low tin pollution levels which show unexpected high catalytic potentials in esterification and transesterification reactions and provide excellent possibility to recycle and re-use of the catalytic active organotin species.

The present invention seeks to provide
1. a tetravalent organotin compound wherein at least one ligand is an organic polymer
2. an insoluble polymer which acts as a heterogeneous catalyst, containing a chemically fixed organotin compound
3. a process for the preparation of the above mentioned insoluble copolymer which acts as a heterogeneous catalyst
4. a process for conducting esterification or transesterification reactions applying such heterogeneous catalyst containing a chemically fixed organotin compound.

According to the present invention it provided are compositions and/or compounds defined by the formulas X1 to X3:

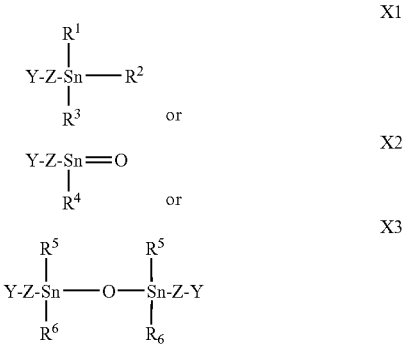

wherein Z=a spacer group like —$(CH_2)_m$— with Y being an insoluble copolymer with

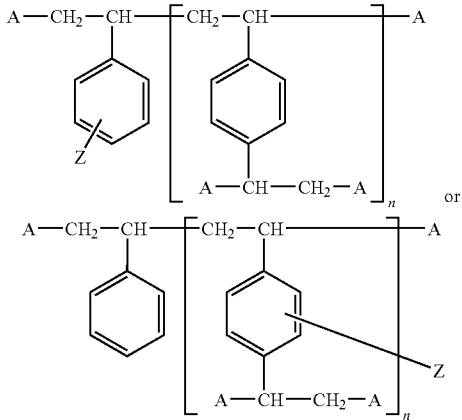

with A being a repeating unit and A=B or C or the end-group of a polymer chain, like $CH_3$, H or alkylphenyl or the tin residue of X1 to X3 with B being a repeating unit and B=

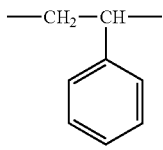

with C being a repeating unit and C=

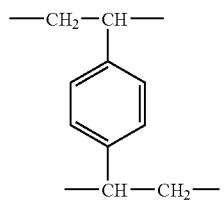

with m=2-24 with n=0.01-15% (mol/mol)

with $R^1$, $R^2$, $R^3$ are independently selected from a halogen (such as chloro, bromo, iodo or fluoro), $C_1$-$C_{18}$ alkyl, $C_1$-$C_{18}$ alkylene, phenyl, vinyl, allyl, naphthyl, aralkyl such as $C_1$-$C_{18}$ alkyl phenyl, Z, and at least one $R^1$, $R^2$, $R^3$ is a halogen (such as chloro, bromo, iodo or fluoro) with $R^4$ being $C_1$-$C_{18}$ alkyl, $C_1$-$C_{18}$ alkylene, phenyl, vinyl, allyl, naphthyl, aralkyl such as $C_1$-$C_{18}$ alkyl phenyl with $R^5$, $R^6$ are independently selected from a halogen (such as chloro, bromo, iodo or fluoro), $C_1$-$C_{18}$ alkyl, $C_1$-$C_{18}$ alkylene, phenyl, vinyl, allyl, naphthyl, aralkyl such as $C_1$-$C_{18}$ alkyl phenyl, Z, and at least one $R^5$, $R^6$ is a halogen (such as chloro, bromo, iodo or fluoro). All residues $R^1$ to $R^6$ may also be—if applicable—linear or branched.

According to the subject matter invention the proviso applies, that if m equals 4 or 6 the residues R1 and R2 are not chlorine and R3 is not a butyl substituent. Those compounds may be applied according to the invention only in the esterification reactions.

The organic spacer length m is preferably 4 (butyl) or 11 (undecyl). The copolymer backbone is preferably a phenyl-group containing copolymer, more preferably a polystyrene-based polymer. The polymeric support of the compositions of matter is a polystyrene-based polymer. However, other phenyl-group containing copolymers can also be used (examples are, but not limited to: acrylnitril-butadien-styrene copolymers, methyl methacrylate-butadien-styrene copolymers, polyphenylenether (co)polymers, polyethylene terephthalate, polyphenylen sulfide, polyurethanes and polyamides). It has been found that crosslinked polystyrene polymers are particularly useful as support material for the heterogeneous catalysts of the present invention. Whereas it is possible to use a variety of crosslinking agents like ethylene glycol dimethacrylate, trimethylolpropane trimethacrylate, divinyl toluene, trivinyl benzene and the like it is preferred to use divinylbenzene as crosslinking comonomer in the polystyrene-based polymer support. Thus it is preferred to use poly(styrene co-divinylbenzene) as support polymer for the preparation of the heterogeneous catalysts as the composition of matter. The polymeric backbone bears end-groups at the end of the polymer chain selected from hydrogen, alkyl, alkylphenyl, saturated vinyl monomer units/compounds applied in the polymerization step, derived from the groups like e.g. vinyl, styrene, vinylbenzene and/or divinylbenzene, ethers, butadiene, methacrylate.

The divinylbenzene content in the copolymer can vary between wide ranges, however it is preferred to use a poly(styrene-co-divinylbenzene) copolymer with an amount of divinylbenzene between 0.01 and 15% (m/m) and particularly between 0.2 and 6% (m/m). It has been found that the poly(styrene-co-divinylbenzene) copolymer support material should be applied for the production of the heterogeneous catalysts in a morphology of small beads, typically with sizes between 20 and 1000 mesh.

Before using the poly(styrene-co-divinylbenzene) copolymer as supporting material it should be prepared and cleaned by a suitable washing procedure. Different solvents and media can be used like NaOH (1M); HCl (1M); NaOH (2M)/dioxane (2/1); HCl (1M)/dioxane (2/1); $H_2O$; DMF; HCl (2M)/MeOH (1/2); MeOH/$CH_2Cl_2$ (3/2); MeOH/$CH_2Cl_2$ (1/2); MeOH/$CH_2Cl_2$ (1/9); cyclohexane. It is preferred to use these media successively to obtain a clean copolymer support. The polymer should be dried at 65° C. under vacuum before preparing the grafted heterogeneous catalysts.

It is advantageous to use metal organic reagents for obtaining a high conversion grafting reaction. It is preferred to substitute a phenyl-hydrogen in the poly(styrene-co-divinylbenzene) copolymer by a suitable metal like Li, Na, K, Mg by organic metalation reactions which are well known by those skilled in the art. For example, one may use a solution of butyl lithium in an inert solvent like hexane, heptane or cyclohexane for a lithiation of the phenyl rings of the poly(styrene-co-divinylbenzene) copolymer.

Generally the grafting agent should be a molecule which can easily react with the metallated poly(styrene-co-divinylbenzene) copolymer like halogenated substances. We have found that α,ω-dihalogen alkanes are advantageous as spacer bridge building agents and therefore grafting precursor. Preferably α,ω-chloro-bromo alkanes can be used with chain lengths as desired for a suitable spacer bridge between the poly(styrene-co-divinylbenzene) copolymer and the active tin species in the heterogeneous catalyst. Examples for such compounds are 1-bromo-3-chloro propane, 1-bromo-4- chloro butane, 1-bromo-5-chloro pentane, 1-bromo-6-chloro hexane, 1-bromo-10-chloro decane, 1-bromo-11-chloro undecane, 1-bromo-12-chloro dodecane. Preferably the butyl- or undecyl-α,ω-chloro-bromoalkanes are used, such as 1-bromo-4-chloro butane or 1-bromo-11-chloro undecane.

The grafting of the active tin species on the poly(styrene-co-divinylbenzene) copolymer can be made by a coupling reaction between the ω-haloalkane substituted copolymer and a suitable tin compound. It is preferred to use an organotin hydride which can be obtained by reaction of the corresponding organotin iodide with a hydrogenating agent like $NaBH_4$.

The organotin iodide can be prepared by reaction of a phenyl substituted organotin compound and iodide. When starting with commercially available organotin chlorides like monomethyltin trichloride, dimethyltin dichloride, tributyltin chloride, monobutyltin trichloride, dibutyltin dichloride, monooctyltin trichloride, dioctyltin dichloride, monododecyltin trichloride, didodecyltin dichloride, monocyclohexyltin trichloride, dicyclohexyltin dichloride it is possible to obtain the corresponding phenyl substituted organotin species by a Grignard reaction with phenyl magnesium chloride which is known in literature and by those skilled in the art.

The organotin hydride when reacted with butyl lithium in an inert solvent like hexane or tetrahydrofuran forms a corresponding organotin lithium derivative which easily reacts with the ω-haloalkane substituted copolymer to form the grafted organotin compound on the poly(styrene-co-divinylbenzene) copolymer as the composition of matter of the present invention.

It is possible to remove phenyl groups at the active tin species grafted on the poly(styrene-co-divinylbenzene) copolymer by reaction of the corresponding copolymer with a solution of hydrogen chloride in methanol. Thus it is possible to obtain heterogeneous organotin catalysts with varying numbers of halogen groups at the active tin species grafted on the copolymer (monohalogen substituted organotin, dihalogen substituted organotin, trihalogen substituted organotin).

The halogen substituted organotin groups grafted on the poly(styrene-co-divinylbenzene) copolymer can be transferred into the corresponding halogen substituted distannoxanes or tin oxides by reaction with methanol in water or aqueous sodium hydroxide in tetrahydrofuran.

The process for the preparation of the organotin compounds according to the invention comprises therefore the following steps:
(a) substitution of a phenyl-hydrogen in a poly(styrene-co-divinylbenzene) copolymer by a suitable metal like Li, Na, K, Mg by organic metalation reactions,
(b) in a second step reacting a dihalogen spacer molecule by with the metalated poly(styrene-co-divinylbenzene) copolymer as of step (a),
(c) and grafting in a third step the spacer-halogen poly (styrene-co-divinylbenzene) copolymer with a organotin hydride to yield the organotin compounds.

Preferably supported heterogeneous organotin compounds of formula X1 with a butyl or undecyl spacer group, equivalent to m=4 or m=11 and R1 to R3 to be chlorine can be employed as catalysts for esterification or transesterification reactions. Other preferred supported heterogeneous organotin compounds useful in such reactions are (a) polymer-grafted dihalogen alkyl tin or (b) polymer-grafted dialkyltin chloride compounds, preferably characterized for (a) by formula X1 having a butyl or undecyl spacer group, equivalent to m=4 or m=11 and R1 and R2 to be chlorine and R3 to be all structural isomers of butyl or octyl or for (b) compounds of formula X1 with m=4 or m=11 and R1 and R2 to be all structural isomers of butyl or octyl and R3 to be chlorine. Most preferred are supported heterogeneous organotin compounds of formula X1 with a butyl spacer group, equivalent to m=4 and R1 to R3 to be chlorine.

Referring to formula X2 preferred supported heterogeneous organotin compounds with a butyl or undecyl spacer group, equivalent to m=4 or m=11 and R4 to be butyl are useful catalysts for esterification or transesterification reactions.

Referring to formula X3 preferred supported heterogeneous organotin compounds with a butyl or undecyl spacer group, equivalent to m=4 or m=11 and R5 to be butyl and R6 to be chlorine are useful catalysts for esterification or transesterification reactions.

Esterification reactions using the catalyst may be accomplished by the usual reaction between an acid or acid anhydride and an alcohol in an organic medium in the presence of the catalyst according to the present invention. Reaction temperatures are usually between 50° C. and 280° C., reaction time can vary between 0.5 and 24 hours. At the end of the reaction the liquid reaction products can be separated from the solid heterogeneous organotin catalysts by filtration or decantation or sedimentation step or any other mean of phase separation. The catalysts can be washed if desired and then reused again in the esterification reaction. A fresh charge of the reaction educts may then be added and the catalysts can be reused again for several times.

Transesterification reactions using the catalyst may be accomplished by the typical reaction between an ester and an alcohol in an organic medium in the presence of the catalyst according to the present invention. Reaction temperatures are usually between 50° C. and 200° C., reaction time can vary between 0.5 and 24 hours. At the end of the reaction the liquid reaction products can be separated from the solid heterogeneous organotin catalysts by filtration or decantation or sedimentation step or any other mean of phase separation. The catalysts can be washed if desired and then reused again in the transesterification reaction. A fresh charge of the reaction educts may then be added and the catalysts can be reused again for several times.

It is part of the present invention that the grafted organotin species on the poly(styrene-co-divinylbenzene) copolymer support show unusual and excellent catalytic properties and potentials. In contrast to esterification and transesterification reactions catalyzed by homogeneous organotin compounds we have found that nearly all different heterogeneous organotin catalysts of the present invention have a high catalytic potential in the corresponding reaction.

For example a grafted organotin dihalogenide (i.e., a dialkyltin) according to the present invention is a good catalyst in esterification reactions which is not the case inhomogeneous catalysis.

Also, we have found that a grafted organotin trihalogenide (i.e., a monoalkyltin) according to the present invention is a good catalyst in transesterification reactions which is not the case in homogeneous catalysis.

These catalysts show unexpectedly high catalytic potentials compared to results reported for grafted dichloro tin species (i.e., a dialkyltin dichloride) by Mercier (*Organometallics,* 2001, 958) who uses the same transesterification test but with much longer reaction times). Moreover also grafted organotin monohalogenides (i.e., a trialkyltin) according to the present invention show good catalytic potentials in esterification and transesterification. Mercier discloses comparable dichloro compounds requiring transesterification reaction times of at least 24 hours even in the first run.

The present application discloses catalysts reducing the reaction time to only 4 hours at 80° C., being distinct below the reflux conditions Mercier applies. It has been thus unexpectedly found, that the reaction time is even more dramatically reduced at extremely high conversion rates of at least 95% (in most cases higher than 99%) using compounds of formula X1 in esterification reactions.

Furthermore it is to be considered inventive that the compounds disclosed in the present application are easy to recycle and re-use by repeated phase separation from esterification or transesterification reaction mixtures, repeated washing and re-suspension in fresh reaction mixtures.

Further subject of the present invention are esters produced by esterification or transesterification reactions by use of organotin compounds as defined by the formulas X1 to X3 following a process as defined before, comprising a mixture of two esters (for the transesterification reaction) or comprising an alcohol and an acid (organic carboxylic acid—for the esterification) and an amount of 0.001 to 1 mol % of the catalyst at a reaction temperature of 50° C. to 200° C. for the transesterification and 50-280° C. for the esterification process, characterized by a tin content below 50 ppm for the transesterification products and below 550 for most of the esterification products. The higher amount for the esterification products is mainly due to the higher conversion temperature resulting in more—extractable and tin containing—decomposition by-products.

The following examples are presented to illustrate but not to limit various embodiments of the present invention.

EXAMPLES

Synthesis of Organotin Precursors

Synthesis of Dibutyldiphenyltin

In a three-necked flask, a solution of bromobenzene (62.8 g, 400 mmol) in diethyl oxide was added on magnesium (12 g, 500 mmol) covered with dry diethyl oxide. When the addition was completed, the mixture was refluxed during one hour. This solution was then added to dibutyltin dichloride (30 g, 98.8 mmol) in 150 mL of diethyl oxide and refluxed for 3 hours. The mixture was hydrolysed with a minimum of water, washed with a saturated aqueous solution of sodium chloride, dried over magnesium sulphate and concentrated. Purification by liquid chromatography on silica gel (eluent: petroleum ether) gave an oil (28.6 g, 74.5 mmol).

Yield: 75%

$^1$H NMR (CDCI$_3$) δ: 7.69 (4H, bs); 7.50 (6H; bs); 1.83 (4H, m); 1.53 (8H, bs); 1.08 (6H, t, J=7.3 Hz).

$^{13}$C NMR (CDCI$_3$) δ: 140.78; 137.23; 128.69; 29.44; 27.84; 14.12; 10.72.

$^{119}$Sn NMR (C$_6$D$_6$) δ: −71.7 ppm.

Synthesis of Dibutylphenyltin Iodide

In a three-necked flask protected from light, dibutyl diphenyltin (10 g, 25.9 mmol) was solubilized in 50 mL of dry methanol. A solution of iodine (6.04 g, 23.76 mmol) in methanol was then added slowly. After stirring at room temperature for 16 hours, methanol was eliminated under vacuum. The residue was dissolved in petroleum ether and washed with a saturated aqueous solution of sodium thiosulphate. Organic layers were washed with a saturated sodium chloride solution and dried over MgSO$_4$. Solvent was evaporated and the crude product was distilled using a Kugelrohr apparatus (rotating glass oven for fractionating distillation of small sample volumes at 60° C. A colourless oil was obtained (10.5 g, 24.0 mmol).

Yield=93%

$^1$H NMR (CDCI$_3$) δ: 7.50 (2H, bs), 7.17 (2H, bs), (12H), 1.05 (6H, t, J=7.3 Hz)

$^{119}$Sn NMR (CDCI$_3$) δ: 13.9 ppm

Synthesis of Dibutylphenyltin Hydride

In a Schlenk tube, a suspension of NaBH$_4$ (1.96 g, 51.9 mmol) in 50 mL of absolute ethanol was cooled at 0° C. under nitrogen. A solution of Bu$_2$SnPhI (15.1 g, 34.6 mmol) in ethanol was then added slowly under stirring. After 3 hours at room temperature in the dark, petroleum ether was added, the solution was washed with water and dried over MgSO$_4$. Solvents were eliminated under reduced pressure and the residue was distilled under high vacuum. A colourless oil was obtained (7.2 g, 30.8 mmol).

Yield: 89%

$^1$H NMR (C$_6$D$_6$) δ: 7.29 (2H, t, J=6 HZ), 7.17 (3H, t, 6 Hz), 5.80 (1H, m), 1.56 (4H, m), 1.41 (4H, m), 1.19 (4H, m), 0.96 (6H, t, J=7.3 Hz)

$^{13}$C NMR (C$_6$D$_6$) δ: 139.27; 137.24; 128.52; 128.29; 127.97; 127.65; 29.88; 27.35; 13.79; 9.43.

$^{119}$Sn NMR (C$_6$D$_6$) δ: −111.0 ppm.

Synthesis of Butyltriphenyltin

In a three-necked flask, a solution of 1-bromobutane (34.25 g, 250 mmol) in diethyl oxide was added on magnesium (7.3 g, 300 mmol) covered with dry diethyl oxide. When the addition was completed, the mixture was refluxed during one hour. This solution was then added to triphenyltin chloride (42.6 g, 110 mmol) in 150 mL of diethyl oxide and refluxed for 3 hours. The mixture was hydrolysed with a minimum of water, washed with a saturated aqueous solution of sodium chloride, dried over magnesium sulphate and concentrated. Crystallization of the crude product in methanol gave a white solid (32.3 g, 93 mmol).

Yield: 85% mp=64.8° C.

$^1$H NMR (CDCI$_3$) δ: 7.46 (6H; m; $^2$J(Sn—H)=54 Hz; H$_{a,d}$); 7.28 (9H; m; H$_{b,c,d}$); 1.7 (2H; m; H$_3$); 1.6 (2H; m; H$_4$); 1.44 (2H, sext; $^3$J=7.1 Hz; H$_2$); 0.91 (3H; t; $^3$J=7.1 Hz; H$_1$)

$^{13}$C NMR (CDCI$_3$) δ: 138.6 (C$_f$, $^1$J(Sn—C)=483/460 Hz); 136.5 (C$_{b,d}$, $^3$J(Sn—C)=35.1 Hz); 128.2 (C$_c$, $^4$J(Sn—C)=10.4 Hz); 127.9 (C$_{a,e}$, $^2$J(Sn—C)=17.6 Hz); 28.3 (C$_3$, $^2$J(Sn—C)= 21.8 Hz); 26.8 (C$_2$, $^3$J(Sn—C)=64.6 Hz); 13.0 (C$_1$, $^4$J(Sn—C)=15.4 Hz); 10.3 (C$_4$, $^1$J(Sn—C)=398/380 Hz).

$^{119}$Sn NMR (C$_6$D$_6$) δ: −99.3.

Synthesis of Butyldiphenyltin Iodide

In a three-necked flask protected from light, butyltriphenyltin (21.05 g; 51.8 mmol) was dissolved in 50 mL of dry methanol. A solution of iodine (12.06 g; 47.5 mmol) in methanol was then added slowly. After stirring at room temperature during 16 hours, methanol was eliminated under vacuum. The residue was dissolved in petroleum ether and washed with a saturated aqueous solution of sodium thiosulphate. Organic layers were washed with a saturated NaCI solution and dried over MgSO$_4$. Solvent was evaporated and the crude product was distilled using a Kugelrohr apparatus at 60° C. A colourless oil was obtained (22.2 g, 48.6 mmol).

Yield=94%

$^1$H NMR (CDCl$_3$) δ: 7.88 (6H, m, H$_{b,c,d}$); 7.46 (6H, m, H$_{a,d}$); 2.31 (2H, m, AA'BB', H$_{4,3}$); 1.89 (2H, sext, $^3$J=81 Hz, H$_2$); 1.41 (3H, t, $^3$J=8.1 Hz, H$_1$)

$^{13}$C NMR (CDCl$_3$) δ: 137.2 (C$_f$, $^1$J(Sn—C)=130 Hz); 136.5 (C$_{a,e}$, $^2$J(Sn—C)=45.7 Hz); 130.0. (C$_c$, $^4$J(Sn—C)=26.3 Hz); 128.9 (C$_{b,d}$, $^3$J(Sn—C)=55.3 Hz); 28.9 (C$_3$, $^2$J(Sn—C)=27.6 Hz); 26.7 (C$_2$, $^3$J(Sn—C)=74.4 Hz); 17.2 (C$_4$, 4J(Sn—C)=399/381 Hz); 13.7 (C$_1$)

$^{119}$Sn NMR (C$_6$D$_6$) δ: 51.8 ppm

Synthesis of Butyldiphenyltin Hydride

In a Schlenk tube, a suspension of NaBH$_4$ (1.31 g, 34 mmol) in 50 mL of absolute ethanol was cooled at 0° C. under nitrogen. Then, a solution of BuSnPh$_2$1 (22.2 g) in ethanol was added slowly under stirring. After 3 hours at room temperature in the dark, petroleum ether was added, the solution was washed and dried over MgSO$_4$. Solvents were eliminated under reduced pressure. A colourless oil was obtained (6.67 g, 0.02 mmol).

Yield: 92%

$^1$H NMR (C$_6$D$_6$) δ: 7.86 (6H, m, H$_{a,d}$, $^1$J(Sn—H)=55.4 Hz); 7.5 (6H, m, H$_{b,c,d}$); 6.4 (1H, s, $^1$J(Sn—H)=1795/1713 Hz, Sn—H); 1.64 (2H, m, $^3$J=7.3 Hz, H$_2$); 1.42 (4H, m, AA'BB', H$_{4,3}$); 0.9 (3H, t, $^3$J=7.3 Hz, H$_1$)

$^{13}$C NMR (CDCl$_3$) δ: 139.3 (C$_{b,d}$, $^3$J(Sn—C)=36.2 Hz); 137.5 (C$_f$, $^1$J(Sn—C)=201.3/188.7 Hz); 129.2 (C$_c$, $^4$J(Sn—C)=11.4 Hz); 128.9 (C$_{a,e}$, $^2$J(Sn—C)=22.9 Hz); 29.6 (C$_3$, $^2$J(Sn—C)=22.8 Hz); 27.48 (C$_2$, $^3$J(Sn—C)=61.1 Hz); 13.9 (C$_1$); 10.4 (C$_4$, $^1$J(Sn—C)=312/296 Hz)

$^{119}$Sn NMR (C$_6$D$_6$) δ: −136.4 ppm.

Synthesis of Tricyclohexyltin Chloride

In a 500 mL three-necked flask, trimethylsilyl chloride (170 g, 109 mmol) was added to tricyclohexyltin hydroxide (80 g, 133 mmol) and heated at reflux during 18 hours. After distillation of trimethylsilyl chloride in excess and hexamethyldisiloxane under reduced pressure, the crude product was recrystallized in petroleum ether. White needles were obtained (39.82 g, 79.6 mmol).

Yield: 73%

$^1$H NMR (CDCl$_3$) δ: 2.1-1.31 (33H, ma)

$^{13}$C NMR (CDCl$_3$) δ: 34.25; 31.56; 29.27; 27.22.

$^{119}$Sn NMR (CDCl$_3$) δ: 70.3 ppm

Synthesis of Tricyclohexyltin Hydride

A mixture (400 mL) of diethyl oxide:water 1:1 was cooled at 0° C. under nitrogen in a three-necked flask of 1 L. Sodium borohydride (3 g, 79.4 mmol) and then tricyclohexyltin hydroxide (30 g, 62.2 mmol) were successively and carefully added. After addition of 100 mL of diethyl oxide, the mixture was stirred 2 days at room temperature. After separation, the organic layer was dried over magnesium sulphate and evaporated under reduced pressure. The crude product was distilled under high vacuum to afford, a colourless oil (23.23 g; 63 mmol).

Yield: 81%

$^1$H NMR (CDCl$_3$) δ: 5.29 (s, 1H); 2.82-1.39 (bs, 33H).

$^{13}$C NMR (CDCl$_3$) δ: 31.56; 27.57; 25.62; 24.37.

$^{119}$Sn NMR (CDCl$_3$) δ: −92.8 ppm.

Syntheses of Organotin Supported Compounds

Synthesis of P4CI

CombiGel XE-305 [Aldrich, 1% cross-linked poly(styrene-co-divinylbenzene) copolymer, 50-100 mesh, 150-300 μm beads]=P—H (6.3 g) was covered with 45 mL of dry cyclohexane.

Freshly distilled TMEDA (N,N,N',N'-Tetramethylethylen diamine, 9 mL; 60 mmol) and n-butyllithium (2.5 M in hexanes) (30 mL, 75 mmol) were successively added. The mixture was stirred at 65° C. during 4-hours. Residual butyllithium was eliminated by transfer with a canula and the polymer was washed twice with dry cyclohexane. Then, the treatment with butyllithium was repeated. The lithiated polymer P—Li was washed several times with dry THF, under nitrogen, until no more butyllithium was present in the washing solution (α-naphtylphenylamine test). The pink polymer P—Li was covered with 30 mL of anhydrous THF (tetrahydrofuran) and a solution of 1-bromo-4-chlorobutane (13.2 g, 60 mmol) in THF (30 mL) was added at 0° C. After 6 hours at room temperature, the polymer was washed once with 50 mL of a mixture THF/H$_2$O (1/1); four times with 50 mL of THF and twice with 50 mL of ethanol, and dried. 8.9 g of P4CI were obtained.

Three batches were prepared:

P4CI-1: Percentage of functionalization T=33.4%, Degree of functionalization N$^{CI}$=2.53 mmol/g Microanalyses (%): C, 83.22; H, 8.03; CI, 8.84; Br, 0.18

P4CI-2: T=23%, N$^{CI}$=1.85 mmol/g

Microanalyses (%): C, 83.33; H, 8.21; CI, 6.55; Br, 0.32

P4CI-3: T=22.8%, N$^{CI}$=1.83 mmol/g

Microanalyses (%): C, 81.50; H, 8.14; CI, 6.50; Br, 0.94

Synthesis of P11CI

The synthesis route for P11CI is the same as for P4CI, Br(CH$_2$)$_{11}$CI will be used instead of 1-bromo-4-chlorobutane.

Synthesis of Br(CH$_2$)$_{11}$CI

In a 250 mL three-necked flask, 11-bromoundecanol (109, 39.8-mmol), pyridine (2 mL, 24.7 mmol) and thionyl chloride (10 ml, 137 mmol) were successively introduced. The solution was stirred at room temperature and the reaction was followed by IR. After disappearance of the OH band, the mixture was hydrolysed carefully by addition of water, the aqueous layer was extracted three times with diethyl oxide. The organic layers were washed successively with a 10% HCl aqueous solution, water, a saturated aqueous solution of NaHCO$_3$ and water until neutrality. After drying over MgSO$_4$ and elimination of solvents under reduced pressure, the oil was filtered on silica gel (eluent: pentane). A colourless oil was obtained (10.15 g, 35 mmol).

Yield: 88%.

$^1$H NMR (CDCl$_3$) δ: 3.50 (2H, t, J=Hz); 3.38 (2H, t, J=Hz); 1.78 (4H, m); 1.38 (4H, m); 1.26 (10H, bs).

$^{13}$C NMR (CDCl$_3$) δ: 45.17; 34.03; 32.86; 32.68; 29.45; 29.42; 28.90; 28.78; 28.19; 26.90.

Stannylation Reaction

General procedure. Diisopropylamine (1 eq.) and n-Buli (2.5 M in hexanes) (1 eq.) were successively added to 20 mL of dry THF at 0° C. After 5 minutes of stirring, the appropriate hydride (1 eq.) was added slowly and the mixture was stirred 30 min further. This solution of R$_3$SnLi (in large excess) was slowly added to P4CI (6 g) suspended in 40 mL of dry THF. The mixture was stirred for 15 hours at room temperature. After filtration, the polymer was washed with 40 mL of THF/H$_2$O (50/50), 40 mL of THF (6 times) and 20 mL of ethanol (twice).

| | Solid-state NMR | Microanalysis: found (%) | | | | Functionalization | |
|---|---|---|---|---|---|---|---|
| | $^{119}$Sn | C | H | Sn | CI | T (%) | N$^{Sn}$ (mmol/g) |
| P4Sn Bu$_2$Ph | — | 74.11 | 8.52 | 13.80 | 0.25 | 21 | 1.16 |
| P4BuSnPh$_2$ | −76.7 | 77.24 | 7.49 | 14.00 | 0.16 | 25 | 1.18 |
| P4SnCy$_3$ | — | 77.57 | 8.65 | 13.11 | 1.43 | 22 | 1.10 |
| P11SnBu$_2$Ph | — | 82.96 | 9.28 | 1.6 | 4.26 | 1.6 | 10$^{-3}$ |
| P11BuSnPh$_2$ | — | 77.95 | 8.53 | 10.90 | 1.92 | 17 | 0.92 |
| P11SnCy$_3$ | — | 75.84 | 9.32 | 13.49 | <0.04 | 29 | 1.14 |

Synthesis of P4SnBu$_2$CI

A solution of HCI in methanol (2.48 mol*l$^{-1}$, 10 mL) was added to P4SnBu$_2$Ph (8 g) suspended in 40 mL of absolute methanol. The mixture was heated at 65° C. during 24 hours. After filtration, the polymer was washed 8 times with 30 mL of methanol and dried, 7.8 9 of P4SnBu$_2$CI were obtained.

Microanalysis (%): C, 71.59; H, 7.93; CI, 4.22; Sn 14.71. T=21.9%, N$^{CI}$=1.19 mmol/g, N$^{Sn}$=1.24 mmol/g $^{119}$Sn solid-state NMR δ: 139.1 ppm Synthesis of P4SnBuCI$_2$ A solution of HCI in methanol (2.48 mol*l$^{-1}$, 20 mL) was added to P4SnBuPh$_2$ suspended in 40 mL of absolute methanol. The mixture was heated at 65° C. during 24 hours. After filtration, the polymer was washed 8 times with 30 mL of methanol.

Microanalysis (%): C, 66.92; H, 6.90; CI; 9.63; Sn: 15.50 T=25.1%. N$^{CI}$=2.72 mmol/g. N$^{Sn}$=1.31 mmol/g $^{119}$Sn solid-state NMR δ: 200.4 ppm Synthesis of P4SnCIO A solution of tin chloride (IV) (1 eq.) in toluene was slowly added to a suspension of PnSnCY$_3$ in toluene. After 48 hours in the dark, the polymer PnSnCI$_3$ was filtered and washed eight times with pentane- and twice with ethanol.

Synthesis of P4SnCIO

Water (2 eq.) was added to a suspension of P4SnBuCI$_2$ (1 g) in methanol at 65° C. After 6 hours, the polymer was filtered and the treatment with water was repeated and heated at 65° C. during 18 hours. Then, the polymer was washed 8 times with methanol and dried.

$^{119}$Sn solid-state NMR δ: 175 ppm

Synthesis of P4SnO

An aqueous solution of potassium hydroxide (10 eq., 4M) was added to a suspension of polymer P4SnBuCI$_2$ (300 mg) in 20 mL of dry THF at 65° C. After 24 hours, the polymer was filtered and washed successively with a mixture THF/H$_2$O (50/50), THF and ethanol.

Synthesis of P11SnBu$_2$CI, P11SnBuCI$_2$, P11SnCI$_3$, P11SnCIO, P11SnO

The synthesis of the grafted heterogeneous organotin catalysts with a spacer length of 11 CH$_2$-groups can be performed according to the corresponding P4 compounds.

General Procedures of Catalysis Test Reactions:

Procedure 1.
Esterification Test Reaction: For evaluation of the catalytic potential of the heterogeneous catalysts in esterification reactions an appropriate test reaction has been developed and used. In a reaction vessel under a nitrogen atmosphere phthalic anhydride (1 eq.) was reacted with 2-ethyl hexanol (2 eq.) at 220° C. for 4 hours after addition of appropriate amounts of the catalyst [0.1 mol % as tin]. The amount of unreacted acid at the end of the reaction, expressed in terms of Acid Number is determined. The catalyst can be separated from reaction products and recycled by carrying out another esterification reaction for an evaluation of reuse capabilities of the catalyst. At the end of each reaction the liquid reaction products were separated from the solid heterogeneous organotin catalysts by filtration. The catalysts were washed and then reused again in the esterification reaction. The tin leaching from the catalyst into the reaction products can be analyzed (tin content).

Procedure 2.
Transesterification Test Reaction: For evaluation of the catalytic potential of the heterogeneous catalysts in transesterification reactions an appropriate test reaction has been developed and used. In a reaction vessel under a nitrogen atmosphere ethyl acetate (1 eq.) was reacted with the alcohol 1-octanol (7 eq.) at 80° C. for 4 hours after addition of appropriate amounts of the catalyst [0.1 mol % as tin). The assessment and analysis of the reaction (ratio initial alcohol/obtained ester, amount of transesterified ester compound) is possible by GC (quantitative method). The catalyst can be separated from reaction products and recycled by carrying out another transesterification reaction for an evaluation of reuse capabilities of the catalyst. At the end of each reaction the liquid reaction products were separated from the solid heterogeneous organotin catalysts by filtration. The catalysts were washed and then reused again in the transesterification reaction. The tin leaching from the catalyst into the reaction products can be analyzed (tin content).

Procedure 3.
Tin Leaching: The reaction products of the test reactions and recycle test series have been analyzed with respect to their organotin content. The leaching of tin compounds out of the heterogeneous catalysts was checked and measured by a suitable Soxhlet extraction procedure (extracting agent: ethyl acetate, extraction time: 6 h).

Results Procedure 1—Esterification Test Reaction

| Heterogeneous Catalyst | Acid Number | Reaction Rate | Tin-Content [ppm] |
|---|---|---|---|
| P4SnBu$_2$Cl | 0.6 | 99.88 | 305 |
| P4SnBu$_2$Cl (recycled) | 2.3 | 99.54 | 207 |
| P4SnBu$_2$Cl (recycled) | 2.4 | 99.52 | 212 |
| P4SnBu$_2$Cl (recycled) | 11.9 | 97.63 | 68 |

-continued

| Heterogeneous Catalyst | Acid Number | Reaction Rate | Tin-Content [ppm] |
|---|---|---|---|
| P4SnCl$_3$ | 2.3 | 99.54 | 556 |
| P4SnCl$_3$ (recycled) | 2.7 | 99.46 | not detectable |
| P4SnCl$_3$ (recycled) | 4.4 | 99.12 | not detectable |
| P4SnCl$_3$ (recycled) | 5.9 | 98.82 | 60 |
| P4SnBuCl$_2$ | 1.1 | 99.78 | 188 |
| P4SnBuCl$_2$ (recycled) | 0.9 | 99.82 | 19 |
| P4SnBuCl$_2$ (recycled) | 1.4 | 99.72 | 62 |
| P4SnBuCl$_2$ (recycled) | 4.6 | 99.08 | 23 |
| P4SnClO-1 | 1.4 | 99.72 | 104 |
| P4SnClO-1 (recycled) | 0.8 | 99.84 | 104 |
| P4SnClO-1 (recycled) | 1.6 | 99.68 | 86 |
| P4SnClO-1 (recycled) | 2.5 | 99.50 | 129 |
| P4SnO | 1.5 | 99.70 | 269 |
| P4SnO (recycled) | 0.5 | 99.90 | 66 |
| P4SnO (recycled) | 2.8 | 99.44 | 275 |
| P4SnO (recycled) | 0.6 | 99.88 | 155 |
| P11SnBuCl$_2$ | 0.5 | 99.90 | 149 |
| P11SnBuCl$_2$ (recycled) | 1 | 99.80 | 86 |
| P11SnBuCl$_2$ (recycled) | 0.9 | 99.82 | 107 |
| P11SnBuCl$_2$ (recycled) | 4.1 | 99.18 | 198 |
| P11SnCl$_3$ | 1.8 | 99.64 | 630 |
| P11SnCl$_3$ (recycled) | 1.3 | 99.74 | not detectable |
| P11SnBu$_2$Cl | 2.1 | 99.58 | 44 |
| P11SnBu$_2$Cl (recycled) | 4.0 | 99.20 | 16 |
| P11SnBu$_2$Cl (recycled) | 5.1 | 98.98 | 9 |
| P11SnClO | 1.2 | 99.76 | 306 |
| P11SnClO (recycled) | 1.5 | 99.70 | 135 |
| P11SnClO (recycled) | 3.2 | 99.36 | 139 |
| P11SnClO (recycled) | 7.5 | 98.51 | 187 |
| P11SnO | 1.2 | 99.76 | not detectable |
| P11SnO (recycled) | 1.4 | 99.72 | 115 |
| P11SnO (recycled) | 4.3 | 99.14 | 99 |
| P11SnO (recycled) | 4.3 | 99.14 | 265 |
| P11SnBu$_2$Cl | 0.7 | 99.86 | 289 |
| P11SnBu$_2$Cl (recycled) | 0.4 | 99.92 | 62 |
| P11SnBu$_2$Cl (recycled) | 5.6 | 99.88 | 215 |

Results Procedure 2—Transesterification Test Reaction

| Heterogeneous Catalyst | Ethanol | Ethyl acetate | 1-Octanol | 1-Octyl acetate | Conversion | Tin Content [ppm] |
|---|---|---|---|---|---|---|
| P4SnBu$_2$Cl | 0.42 | 85.44 | 15.98 | 1.41 | 6.12 | 3 |
| P4SnBu$_2$Cl (recycled) | 1.21 | 83.87 | 13.77 | 4.06 | 17.61 | 3 |
| P4SnBu$_2$Cl (recycled) | 1.3 | 80.39 | 14.02 | 4.89 | 21.21 | 4 |
| P4SnBu$_2$Cl (recycled) | 2.01 | 81.38 | 12.53 | 6.79 | 29.45 | 7 |
| P4SnBu$_2$Cl (recycled) | 1.84 | 82.63 | 11.93 | 6.47 | 28.06 | 9 |
| P4SnBu$_2$Cl (recycled) | 2.29 | 80.31 | 9.68 | 8.55 | 37.08 | 9 |
| P4SnBu$_2$Cl (after extraction) | 0.87 | 83.26 | 15.42 | 3.07 | 13.32 | not detectable |
| P4SnBuCl$_2$ (*) | 0.28 | 87.68 | 16.98 | 0.90 | 3.90 | 3 |
| P4SnBuCl$_2$ (recycled) (*) | 0.52 | 84.03 | 16.15 | 1.84 | 7.98 | 3 |
| P4SnBuCl$_2$ (recycled) (*) | 0.52 | 81.79 | 17.12 | 2.06 | 8.94 | 7 |
| P4SnBuCl$_2$ (recycled) (*) | 0.84 | 80.63 | 14.85 | 3.18 | 13.79 | 8 |
| P4SnBuCl$_2$ (recycled) (*) | 1.29 | 83.3 | 13.49 | 4.5 | 19.52 | 8 |
| P4SnBuCl$_2$ (recycled) (*) | 1.24 | 78.64 | 14.59 | 6.03 | 26.15 | 6 |
| P4SnBuCl$_2$ (recycled) (*) | 1.52 | 75.51 | 16.03 | 8.43 | 36.56 | 9 |
| P4SnCl$_3$ (after extraction) | 4.86 | 81.73 | 4.42 | 16.19 | 70.22 | 8 |
| P4SnCl$_3$ | 3.68 | 74.19 | 7.02 | 14.44 | 62.63 | 23 |
| P4SnCl$_3$ (recycled) | 4.21 | 76.88 | 5.91 | 15.11 | 65.54 | 3 |
| P4SnCl$_3$ (recycled) | 3.76 | 77.38 | 7.08 | 13.20 | 57.25 | 25 |
| P4SnCl$_3$ (recycled) | 3.49 | 75.30 | 7.50 | 14.49 | 62.85 | 2 |
| P4SnCl$_3$ (recycled) | 4.20 | 77.09 | 6.07 | 14.32 | 62.11 | 5 |
| P4SnCl$_3$ (recycled) | 3.87 | 74.71 | 6.67 | 14.72 | 63.85 | 4 |
| P4SnCl$_3$ (recycled) | 3.62 | 77.99 | 7.26 | 12.70 | 55.08 | 2 |
| P4SnCl$_3$ (recycled) | 3.26 | 80.18 | 9.09 | 11.26 | 48.84 | 6 |
| P4SnCl$_3$ (recycled) | 3.29 | 84.75 | 7.9 | 11.23 | 48.71 | 9 |
| P4SnClO-1 | 0.53 | 83.21 | 15.95 | 1.96 | 8.50 | 2 |
| P4SnClO-1 (recycled) | 0.88 | 84.30 | 13.82 | 3.15 | 13.66 | 5 |
| P4SnClO-1 (recycled) | 0.80 | 84.76 | 14.86 | 2.84 | 12.32 | 3 |
| P4SnClO-1 (recycled) | 0.70 | 78.93 | 16.21 | 3.15 | 13.66 | 4 |
| P4SnClO-1 (recycled) | 2.24 | 81.23 | 10.75 | 7.69 | 33.35 | 7 |
| P4SnO | 0.31 | 83.96 | 17.93 | 1.25 | 1.58 | not detectable |
| P11SnBuCl$_2$ | 0.85 | 87.46 | 16.25 | 1.67 | 7.24 | 2 |
| P11SnBuCl$_2$ (recycled) | 0.73 | 81.27 | 16.9 | 3.12 | 13.53 | 3 |
| P11SnBuCl$_2$ (recycled) | 1.12 | 87.77 | 13.96 | 3.34 | 14.49 | 5 |
| P11SnBuCl$_2$ (recycled) | 0.91 | 75.8 | 16.89 | 4.35 | 18.87 | 4 |
| P11SnBuCl$_2$ (recycled) | 1.48 | 85.7 | 12.76 | 4.57 | 19.82 | 5 |
| P11SnCl$_3$ | 2.56 | 78.16 | 10.42 | 9.72 | 42.16 | 230 |
| P11SnCl$_3$ (recycled) | 3.90 | 73.05 | 6.35 | 16.32 | 70.79 | 11 |
| P11SnClO | 0.22 | 83.73 | 17.55 | 0.87 | 1.10 | not detectable |
| P11SnClO (recycled) | 0.21 | 83.01 | 16.44 | 0.77 | 0.97 | not detectable |
| P11SnClO (recycled) | 0.27 | 78.33 | 18.48 | 1.51 | 1.91v | not detectable |

-continued

| Heterogeneous Catalyst | Ethanol | Ethyl acetate | 1-Octanol | 1-Octyl acetate | Conversion | Tin Content [ppm] |
|---|---|---|---|---|---|---|
| P11SnClO (recycled) | 0.98 | 80.17 | 16.14 | 4.11 | 5.20 | 6 |
| P11SnO | 0.21 | 84.88 | 16.68 | 0.68 | 0.86 | not detectable |
| P11SnO (recycled) | 0.46 | 83.72 | 15.6 | 1.68 | 2.13 | not detectable |
| P11SnO (recycled) | 0.32 | 81.15 | 17.96 | 1.5 | 1.90 | 6 |

(*) comparative example

It should be noted, that the P4SnBuCl$_2$ according to the Mercier publication only gives moderate conversion rates under the present reaction conditions. Especially the P11SnCl$_3$ and P4SnCl$_3$ give significant higher conversion rates being contrary to the expectations and therefore being surprising.

Results Procedure 3—Tin Leaching from Heterogeneous Catalysts

| Heterogeneous Catalyst | S-Content (Extracting Agent) [ppm] | Sn-Content (Catalyst) |
|---|---|---|
| P4SnBu$_2$Cl | 3 | 14.80% |
| P4SnCl$_3$ | 30 | 15.50% |
| P4SnBuCl$_2$ | 7 | 11.80% |
| P4SnClO-1 | not detectable | 11.90% |
| P4SnO | not detectable | |
| P11SnBuCl$_2$ | not detectable | 11.30% |
| P11SnBu$_2$Cl | not detectable | 12.30% |
| P11SnCl$_3$ | 421 | 15.00% |
| P11SnClO | not detectable | 16.40% |
| P11SnO | not detectable | 16.60% |

The invention claimed is:

1. A process for the transesterification of two esters, which process comprises reacting the two esters in a reaction mixture comprising an effective amount of an organotin compound of the formula X1, X2, or X3:

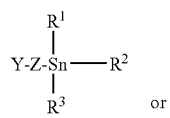
    X1

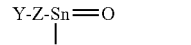
    X2

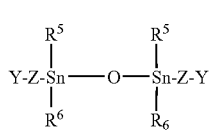
    X3 wherein

Z is —(CH$_2$)$_m$—;

m is a number of from 4 to 24;

and Y is an insoluble phenyl-group containing copolymer,

R$^1$, R$^2$, R$^3$ are independently selected from the group consisting of halogen, C$_1$-C$_{18}$ alkyl, C$_1$-C$_{18}$ alkylene, phenyl, vinyl, allyl, naphthyl and aralkyl, with the proviso that at least one of R$^1$, R$^2$, or R$^3$ is a halogen;

R$^4$ is C$_1$-C$_{18}$ alkyl, C$_1$-C$_{18}$ alkylene, phenyl, vinyl, allyl, naphthyl, or aralkyl;

R$^5$ and R$^6$ are independently selected from the group consisting of halogen, C$_1$-C$_{18}$ alkyl, C$_1$-C$_{18}$ alkylene, phenyl, vinyl, allyl, naphthyl, and aralkyl, with the proviso that at least one of R$^5$ or R$^6$ is a halogen with the proviso that when m is 4 or 6, two of R$^1$, R$^2$, and R$^3$ are not chlorine.

2. A process as recited in claim 1 additionally comprising the step of separating the organotin compound from the reaction mixture by a phase separation means.

3. The process of claim 1 wherein R$^1$, R$^2$, R$^3$, R$^5$ and R$^6$ are halogen or C$_4$-C$_8$ alkyl, and R$^4$ is C$_4$-C$_8$ alkyl.

4. The process of claim 1 wherein R$^1$, R$^2$, R$^3$, R$^5$ and R$^6$ are chlorine, butyl or octyl, and R$^4$ is butyl.

5. The process of claim 1 wherein m is a number from 4 to 11.

* * * * *